United States Patent
Ziembicki

(10) Patent No.: US 9,095,094 B2
(45) Date of Patent: Aug. 4, 2015

(54) PICKUP FOR AN AGRICULTURAL MACHINE

(75) Inventor: Lukasz Ziembicki, Itów (PL)

(73) Assignee: CNH Industrial America LLC, New Holland, PA (US)

( * ) Notice: Subject to any disclaimer, the term of this patent is extended or adjusted under 35 U.S.C. 154(b) by 125 days.

(21) Appl. No.: 13/990,265

(22) PCT Filed: Nov. 21, 2011

(86) PCT No.: PCT/EP2011/070544
§ 371 (c)(1),
(2), (4) Date: Aug. 2, 2013

(87) PCT Pub. No.: WO2012/072436
PCT Pub. Date: Jun. 7, 2012

(65) Prior Publication Data
US 2013/0305683 A1   Nov. 21, 2013

(30) Foreign Application Priority Data
Nov. 29, 2010   (BE) .................................. 2010/0712

(51) Int. Cl.
*A01B 73/00* (2006.01)
*A01D 89/00* (2006.01)
*B60B 33/00* (2006.01)

(52) U.S. Cl.
CPC .......... *A01D 89/004* (2013.01); *B60B 33/0023* (2013.01); *B60B 33/0039* (2013.01); *B60B 33/0049* (2013.01); *B60B 33/0068* (2013.01)

(58) Field of Classification Search
CPC ... A01B 73/00; A01D 89/004; A01D 75/185; A01F 15/106; A60B 33/02; A60B 33/00; A60B 33/021; A60B 33/0023; A60B 33/0039; A60B 33/0042; A60B 33/0049; A60B 33/0068
USPC ................. 16/20; 56/341–344, 364; 172/282, 172/383–386; 244/103 W, 109; 280/86
See application file for complete search history.

(56) References Cited

U.S. PATENT DOCUMENTS

| | | | | |
|---|---|---|---|---|
| 2,179,877 A | * | 11/1939 | Martin | 244/109 |
| 2,508,351 A | * | 5/1950 | Bjerke | 244/103 W |
| 3,962,849 A | * | 6/1976 | Stoessel et al. | 56/10.2 R |
| 4,154,451 A | * | 5/1979 | Young | 280/86 |
| 4,254,532 A | * | 3/1981 | Hager | 16/20 |
| 4,410,194 A | * | 10/1983 | Steilen | 280/86 |
| 5,562,167 A | * | 10/1996 | Honey | 172/386 |
| 2002/0017092 A1 | | 2/2002 | Josset et al. | |
| 2003/0213223 A1 | | 11/2003 | Derschied | |

FOREIGN PATENT DOCUMENTS

EP   2113396 A1   11/2009

* cited by examiner

*Primary Examiner* — Robert Pezzuto
(74) *Attorney, Agent, or Firm* — Patrick M. Sheldrake; Seyed V. Sharifi T.

(57) ABSTRACT

An agricultural machine having a frame carrying a crop pickup mechanism and supported on the ground by means of two support wheels. Each support wheel is rotatably mounted on a carrier that is connected to the frame of the pickup for rotation about a caster axis. Each wheel carrier is connected by a respective spring to a point fixed relative to the frame of the pickup. The spring biases the carrier to cause the support wheel to park in a predetermined direction relative to the frame of the pickup.

6 Claims, 1 Drawing Sheet

PICKUP FOR AN AGRICULTURAL MACHINE

This application is the U.S. National Stage filing of International Application Serial No. PCT/EP2011/070544 filed on Nov. 21, 2011 which claims priority to Belgium Application BE2010/0712 filed Nov. 29, 2010, each of which is incorporated herein by reference in its entirety.

TECHNICAL FIELD

The present invention relates to a pickup for an agricultural machine.

BACKGROUND ART

Certain agricultural machines, such as balers and forage harvesters, are required to pick up crop material that has been cut but still lies on the ground. The mechanism used to gather the crop material from the ground and feed it into the machine for processing is known as, and herein referred to as, a pickup. A pickup typically comprises a drum rotatably mounted on a frame and having radially projecting tines to drive the crop material upwards, past a guide (that is termed a windguard) and then into a feed channel through which the crop material is conveyed into the machine for processing. The construction of the pickup is not of importance to the present invention and has been described only by way of general background.

It is known for a pickup to be supported on two ground wheels and these may be adjustable in order to allow the ground clearance to be adjusted. As the ground wheels are provided only for support, and are not used for steering, they are commonly designed as caster wheels so that they align themselves automatically with the direction of travel of the machine. As is known, a caster wheel is pivotable about a generally vertical axis, generally known as and herein referred to as a caster axis, but the point of contact of the wheel with the ground is offset from the caster axis. As a result, drag rotates the wheel such that its point of contact with the ground always lines up behind the caster axis in the direction of travel thereby causing the wheel to point automatically in the correct direction.

A problem arises with this wheel design when the pickup is transported on public roads with the wheels raised off the ground. When they are not in contact with the ground, the caster wheels can rotate freely and can move to a position where they project laterally beyond the sides of the pickup. In such a position, they may increase the width of the pickup beyond legally permissible limits for transportation on a public highway.

DISCLOSURE OF INVENTION

With a view to mitigating the foregoing disadvantage, the present invention provides a pickup for an agricultural machine having a frame carrying a pickup mechanism and supported on the ground by means of two support wheels, wherein each support wheel is mounted for rotation about a generally horizontal axis on a carrier that is connected to the frame of the pickup for rotation about a generally vertical caster axis, the projection of the caster axis intersecting the ground at a point offset from the point of contact of the wheel with the ground, characterised in that each carrier is connected by a respective spring to a point fixed relative to the frame of the pickup, the spring biasing the carrier to cause the support wheel to be oriented in a predetermined direction relative to the frame of the pickup.

Thus, in the present invention, when the support wheels are raised from the ground the springs acting on their carriers bias them into their predetermined direction, also known as the parked position, in which they do not project impermissibly beyond the frame of the pickup.

In the predetermined direction, the wheels are preferably aligned to steer the pickup in a straight line.

EP 1 362 506 discloses a wheel that is supported by a carrier for rotation about a horizontal axis and the carrier is itself mounted on the pickup to pivot about a second horizontal axis. This arrangement, which acts in the same way as a motorcycle swinging arm suspension, allows height adjustment of the wheel but the wheel has no caster action and does not align automatically with the direction of travel.

EP 2 113 396 discloses a pickup support wheel mounted on a carrier secured to a pivot shaft that defines the caster axis of the wheel. The pivot shaft can rise and fall relative to the frame of the pickup and, when it falls to the limit of its travel, a pin projecting from the pivot shaft interacts with a cam surface to cause the wheel to rotate into a desired position. However, during normal operation of the pickup there is no interaction between the pin and the cam.

As will be familiar to any person who has wheeled an airport baggage trolley or a supermarket trolley, if one of the two front caster wheels of the trolley does not make proper contact with the ground, it tends to oscillate uncontrollably, and this oscillation is more pronounced as the speed of the trolley is increased. The same effect can be experienced with a pickup if, as in EP 2 113 396, it has wheels that are freely rotatable about a caster axis and such oscillation can be most disconcerting to the machine operator and subjects the caster wheel to sudden shocks and endangers stability of the pickup.

It is an advantage of the present invention, that the springs act to prevent uncontrolled oscillation of the caster wheels because they apply a bias load to the wheels during normal operation and thus also act as dampers to absorb and dissipate the energy that can be the cause of such oscillation.

The springs are preferably helical coil springs.

In an embodiment of the invention, the springs are compression coil springs each housed within an annular chamber defined between a cylinder and a piston slidably mounted in the cylinder. In this case, the piston and cylinder may additionally serve as a damper and to keep dirt away from the coils of the spring. Compression springs are more reliable than tension springs and such a mounting of a compression spring can enable it to exert a pulling force on the wheel carrier in the same way as a tension spring.

BRIEF DESCRIPTION OF DRAWINGS

The invention will now be described further, by way of example, with reference to the accompanying drawings, in which.

MODE(S) FOR CARRYING OUT THE INVENTION

Figure 1:
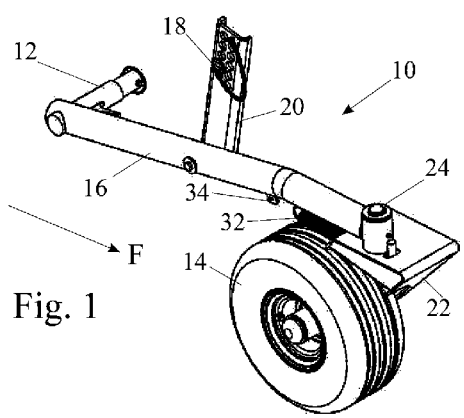
FIG. 1 is a perspective view of a support wheel assembly for a pickup of an agricultural machine.
Figure 2:
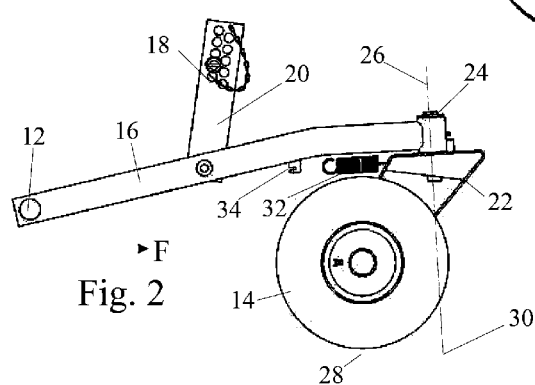
FIG. 2 is a side view of the assembly shown in FIG. 1.

The wheel assembly 10 shown in FIGS. 1 and 2 is separable, and shown separately, from the frame of the pickup to which it is attached during normal use. The wheel assembly comprises an axle 12 that is rotatably received within a bearing assembly that forms part of the frame of the pickup. The support wheel 14 is mounted on an arm 16 connected to the axle 12. The arm 16 can be pivoted about the axle 12 to alter the ride height of the pickup and can be locked in any of a plurality of positions by inserting a pin 18 into aligned holes in the frame and a pillar 20 that is pivotably connected to the arm 16.

The wheel 14 is pivotably mounted on a carrier 22 that can rotate relative to the arm 16 about a generally vertical caster axis 26 defined by a pivot shaft 24. As can be seen from FIG. 2, the point 28 of contact between the wheel 14 and the ground is offset from the point 30 of the projection of the caster axis 26 onto the ground. As a result, the wheel 14 always lines up behind the caster axis 26 in the direction of travel, which is designated by the arrows F in FIGS. 1 and 2.

As so far described, the support wheel assembly is conventional and in the prior art two problems have been encountered with such a wheel design. First, when the wheel 14 is raised off the ground for transportation of the pickup, it can rotate freely and it can move into a position where it projects sideways beyond the legally permissible width of the pickup. Second, when operating over uneven ground and especially when travelling at higher speeds, the caster wheels were prone to uncontrollable oscillation or wobble. The wobble could be so disconcerting that operators would prefer to use fixed wheels, even though such wheels made it difficult to steer the pickup and necessitated the wheels being raised from ground at each turn of the machine.

To overcome both these problems, a spring 32 is provided that is anchored to the carrier 22 when in use and to a bracket 34 on the arm 16 to bias the wheel into a predetermined position, preferably the position in which it steers the pickup to travel in a straight line. This ensures that the wheels do not project sideways from the frame of the pickup when raised from the ground during transportation and it also prevent any wobble of the wheel during normal operation by acting to centre the wheel and as a damper to absorb and dissipate shocks tending to misalign the wheel.

Figure 3:
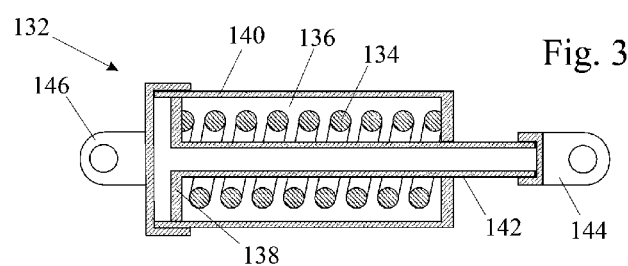
FIG. 3 is a section through a compression coil spring assembly that can be used in place of the tension spring shown in FIGS. 1 and 2.

In place of a tension spring 32 as shown in FIGS. 1 and 2, it is possible to use a spring assembly 132 as shown in FIG. 3. The assembly of FIG. 3 comprises a compression spring 134 that is mounted within an annular chamber 136 defined between a piston 138 and a cylinder 140. The piston rod 142 and the cylinder 140 are fitted with connectors 144 and 146 for attachment to the carrier 22 and the arm 16.

The embodiment of FIG. 3 offers the advantage that a more reliable compression spring is used in place of a tension spring. Furthermore, the piston/cylinder unit in which the spring is housed can assist in damping oscillations on account of the friction between the piston and the cylinder wall. If desired, the piston/cylinder unit may be designed to operate as a gas or hydraulic damper.

The invention claimed is:

1. A pickup for an agricultural machine comprising
a frame carrying a pickup mechanism and supported on the ground by at least two support wheels,
wherein each of the at least two support wheels is mounted for rotation about a generally horizontal axis on an associated wheel carrier connected to the frame of the pickup for rotation about a generally vertical caster axis, a projection of the caster axis-intersecting the ground at a first point offset with respect to an intended forward direction of travel of the pickup mechanism from a second point of contact of the associated one of the at least two support wheel with the ground, each carrier is connected by respective spring to a point fixed relative to the frame of the pickup, the spring biasing the carrier to orient the respective support wheel relative to the frame in the generally forward direction of the pickup mechanism.

2. A pickup as claimed in claim 1, wherein the wheels are aligned to steer the pickup in a straight line.

3. A pickup as claimed in claim 1, wherein the springs are helical coil springs.

4. A pickup as claimed in claim 3, wherein at least one of the springs is a compression coil spring housed within an annular chamber defined between a cylinder and a piston slidably mounted in the cylinder.

5. A pickup as claimed in claim 4, wherein the piston and cylinder housing the spring additionally serve as a damper.

6. A pickup as claimed in claim 1, wherein each carrier is mounted to a respective arm that is pivotally connected to the frame to permit horizontal movement with respect to the ground.

\* \* \* \* \*